Patented Jan. 10, 1939

2,143,489

UNITED STATES PATENT OFFICE 2,143,489

MANUFACTURE OF KETENES AND OLEFINES

Sumner H. McAllister, Lafayette, and William A. Bailey, Jr., Berkeley, Calif., assignors to Shell Development Company, San Francisco, Calif., a corporation of Delaware No Drawing. Application March 19, 1938, Serial No. 197,031

12 Claims. (Cl. 260—550)

This invention relates to reactions of unsaturated ketones and deals with a new and highly advantageous method for converting unsaturated ketones to ketenes and olefinic compounds.

One object of the invention is the production of ketenes in an improved, more simple and economical manner.

Another object of the invention is the provision of a process for producing ketenes in which valuable by-products, more particularly olefinic compounds, may be profitably recovered thereby further reducing the cost of the ketenes.

Still another object of the invention is the provision of a process in which valuable ketene derivatives may be made an alternative product.

Heretofore, the technical source of ketene has been the pyrolysis of acetic acid, acetone and the like, involving high temperatures, low conversions and poor yields. The by-products of the reaction, methane and carbon monoxide principally, are of little value.

We have found that by using unsaturated ketones and non-basic catalysts, good yields of ketenes may be obtained at relatively low temperatures, for example, below 500° C., and more preferably below 400° C., at which undesirable side reactions are avoided and simplicity of equipment and operations facilitated. The process may be used with any unsaturated ketones which may be distilled without susbtantial decomposition and which have a hydrogen atom attached to a saturated carbon atom in the alpha position with respect to the carbonyl group. Suitable olefinic ketones which may be used are, for example, those of the type

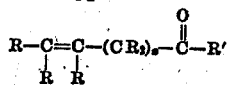

where $x$ is an integer which may be zero and any or all of the R's may be hydrogen or halogen or the same or different alkyl or cyclic or alicyclic groups or any two of the R's may jointly stand for a part of a cyclic structure. R' may be an alkyl or an alicyclic group joined to the carbonyl group by an aliphatic carbon atom having at least one hydrogen atom attached thereto. Any or all of the alkyl or cyclic groups present may contain olefinic linkages and/or substituents such, for example, as halogen or other suitable elements or groups which may be non-reactive or which may be split off and/or otherwise reacted without interfering with the process of our invention. The cyclic and/or alicyclic groups may be carbocyclic or heterocyclic in nature. The unsaturated ketones may be used as pure chemical individuals or as mixtures thereof or as crude products or mixtures containing other compounds which may or may not be reactive under the operating conditions employed in our process.

The unsaturated ketone used in any particular case will depend upon the ketene desired. Where is is economically feasible we prefer to employ aliphatic unsaturated ketones and preferably unsaturated ketones having an olefinic carbon atom not more than twice removed from the carbonyl group and more preferably directly connected thereto. A preferred sub-group of unsaturated ketones comprises those containing a tertiary unsaturated carbon atom. Unsaturated ketones which may be used in our process may be obtained by dehydration of the corresponding hydroxy ketones which may be prepared, for example, by the condensation of a ketone with itself or with another ketone or with an aldehyde as described for example in United States Patent No. 1,714,378, or by reacting β-chloropropionyl chloride or suitable homologues thereof with alkyl zinc iodides or the like, or by other suitable methods.

In order to make the process of our invention more clear, it will be described in greater detail with particular reference to the manufacture of ketene from mesityl oxide in accordance with the reaction

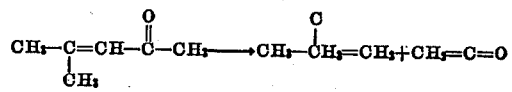

For purposes of clarity only, further specific references will be made to operations in which our preferred catalysts are used. These are the acids of phosphorous, including ortho and meta phosphoric acids, phosphorous acid, hypophosphorous acid, hypophosphoric acid and pyrophosphoric acid. While such acids and catalysts derived therefrom are preferred by us, it will be understood that our invention is not limited thereto as other catalysts, most preferably those of an acidic nature, may also be used. For example, silica gel, zinc chloride, ferric chloride, sulfuric acid, sodium bi-sulfate, boryl phosphate with a phosphorous to boron ratio greater than one and the like may be used provided suitable adjustments are made in the reaction conditions. The catalysts may be used with or without supports and/or promoters. Single catalysts or mixtures of different catalysts may be employed. A particularly advantageous method of preparing catalysts comprised within our preferred group is described, for example, in United States Patent No. 2,018,065 but other methods may also be used and in certain cases modification of the method of the patent, particularly with a view to reducing the final free acid content of the catalyst, may be desirable. Another suitable method of preparing catalysts suitable for use in the process of our invention is described in United States Patent No. 2,051,144. With such catalysts other salts of acids of phosphorous, including, for example those of the alkali and/or alkaline earth metals, of zinc, cadmium, mercury, aluminum, boron, titanium, tin, lead, vanadium, chromium, and tellurium may be used in place of or in addition to those described in the patent. Catalysts such as are described in U. S. Patent 2,108,829 may also be used in the process of our invention.

The process may be carried out in any suitable apparatus. One simple assembly which has been found to be useful comprises a heated tube wherein the catalyst, advantageously in the form of granules or the like, may be packed. When mesityl oxide, for example, is passed at a temperature preferably between about 200° C. and about 400° C., over a catalyst prepared by calcining at between 180° C. and 300° C. a mixture of a phosphoric acid and a siliceous material such as kieselguhr or the like, ketene and isobutylene are are obtained and may be separately or jointly recovered by condensation, scrubbing the exit gases with a solvent for either or both of the reaction products or by other suitable methods.

While the most desirable operating conditions in any particular case depend upon the unsaturated ketone being reacted and the catalyst chosen, it is generally advisable to use temperatures above 200° C. in order to provide a reaction rate which is sufficiently high to give substantial conversions with short times of contact. Excessive temperatures, above 500° C., are undesirable as they favor pyrolysis and the formation of by-products of little value. Short times of contact between catalyst and reactants are desirable to avoid undesirable secondary reactions of the reaction products, particularly resinification and the like which may cause coating of the catalyst with serious reduction of its activity. Contact times of less than twenty seconds are preferred, while those of the order of ten seconds or less are more desirable. Catalysts of high free phosphoric acid content favor polymerization of the olefine produced, particularly tertiary olefines such as iso-butylene. To avoid such reactions we preferably employ catalysts having a free acidity of not more than about 10%, or more advantageously below about 5%, calculated as $H_3PO_4$. In general we find that with catalysts prepared from acids of phosphorous, the higher the total phosphorous content (determined as phosphorous pentoxide) the better the conversion of unsaturated ketones to ketenes and olefines and we prefer to employ catalysts having a phosphorous content of at least 22% by weight. A convenient method of preparing a catalyst which combines many advantages comprises calcining a mixture of orthophosphoric acid and kieselguhr in accordance with the teachings of United States Patent No. 2,018,065 and water washing the product, in the form of 6 to 8 mesh particles, using about seven liters of water per kilogram of catalyst and allowing the water to flow up through the catalyst over a period of about thirty minutes. The catalyst may then be rinsed with distilled water and dried at 110° for fifteen hours. The total phosphorous content of the catalyst in one typical instance was found to have been reduced from 60.4% (expressed as $P_2O_5$) to 59.0% while the free acid calculated as $H_3PO_4$ had been reduced from 25% to 4.6%.

Using a phosphoric acid catalyst at 301° C. average temperature and a feed rate of one volume of liquid mesityl oxide per hour per volume of catalyst a yield of ketene equivalent to 47% of the theoretical, based on reacted ketone, was obtained with fresh catalyst, which dropped, at the end of the run, to about 42%. The yield of isobutylene for the run was 37.5%. Instead of recovering the ketene itself, the exit gases from the reactor may be bubbled through water to transform the ketene to acetic acid and the isobutylene then may be collected in a cold trap or by any other suitable method. The process may be carried out continuously, intermittently or batchwise. Atmospheric or elevated or more preferably, reduced pressures may be used.

By procedure similar to that of the foregoing example, ketene together with other tertiary olefines are obtained from analogous unsaturated higher ketones. Thus from the acid condensation products of methyl ethyl ketone

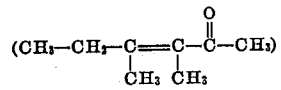

ketene and 3-methyl-pentene-2 are obtained, while 2-methyl hepten-2-one-6

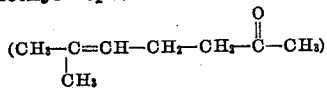

gives ketene and 2-methyl-pentene-2. Our process may also be carried out with unsaturated ketones which contain no tertiary unsaturated carbon atom. Thus vinyl methyl ketone gives ketene and ethylene. From pentene-2-one-4, the dehydrated condensation product of acetone and acetaldehyde, ketene and propylene are obtained which is also the case with methyl isopropenyl ketone obtainable through condensation of methyl ethyl ketone with formaldehyde. Other examples of unsaturated ketones which may be used in the process of our invention include pentene-1-one-4, heptadiene-2,4-one-6, 2,5-dimethyl heptene-2-one-4 and the like.

Instead of the ketenes themselves, suitable derivatives thereof may be produced by only slight modification of the process of our invention. Thus by admitting regulated amounts of water, preferably in the form of steam, with the unsaturated ketone being reacted, the ketene formed may be converted to the corresponding carboxylic acid and/or carboxylic acid anhydride substantially as fast as produced. Where the ketene itself is not desired, such modified procedure is highly advantageous as it results in prolonged catalyst life through retardation of resinification and like undesirable side reactions. Another suitable method of accomplishing the same end comprises adding an acid with the reactants, e. g., gaseous hydrochloric acid may be added and acetyl chloride obtained as a product, or dilute acetic acid may be introduced and more concentrated acetic acid then recovered. Other ketene reactions, such, for example, as those described in United States Patent No. 1,942,110, may likewise be carried out either simultaneously with the ketene production and/or thereafter. In the latter case prompt reaction of the recovered ketene is recommended.

It will thus be evident that our invention provides a new source of a wide variety of valuable products including ketenes, ketene derivatives, olefines and olefine polymers. The invention is capable of wide variation not only with respect to the unsaturated ketones which may be reacted but also in regard to the operating details which may be adopted and it will therefore be clear that our invention is not to be limited to the details described nor by any theory advanced in explanation of the new results attained, but only by the terms of the accompanying claims in which it is our intention to claim all novelty inherent therein as broadly as possible in view of the prior art.

We claim as our invention:

1. A process for producing ketene and isobutylene which comprises contacting mesityl oxide at a temperature between 200° C. and about 500° C. with a calcined mixture essentially comprising a phosphoric acid and a solid absorbent.

2. The process of claim 1 in which the phosphorous content of the calcine mixture is at least 22% and the free acid content is not more than 10% when calculated as $H_3PO_4$.

3. A process for producing ketene and isobutylene which comprises contacting mesityl oxide at a temperature between 200° C. and about 500° C. with a solid catalyst essentially comprising an acid of phosphorous.

4. A process for producing valuable products from mesityl oxide which comprises contacting mesityl oxide with a catalyst comprising essentially a solid compound of acid character at a temperature between 200° C. and the temperature at which substantial thermal decomposition takes place with formation of carbon monoxide.

5. A process for producing valuable products from aliphatic ketones having an olefinic bond which comprises contacting a ketone of the formula

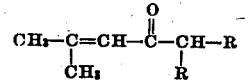

where the R's represent different alkyl groups with a solid catalyst of acid character essentially comprising chemically combined phosphorus at a temperature between 200° C. and the temperature at which substantial thermal decomposition takes place with formation of carbon monoxide.

6. A process for producing valuable products from aliphatic ketones having an olefinic bond which comprises contacting a ketone of the formula

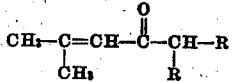

where the R's represent a member of the group consisting of alkyl radicals and hydrogen at a temperature between 200° C. and 500° C. with a solid catalyst comprising essentially a phosphoric acid.

7. A process for producing valuable products from unsaturated ketones which comprises contacting with a catalyst essentially comprising a phosphoric acid an aliphatic methyl ketone having a tertiary unsaturated carbon atom linked to the carbonyl group by a methenyl carbon atom at a temperature between 200° C. and the temperature at which pyrolysis of said ketone takes place with substantial carbon monoxide formation.

8. A process for producing reaction products of ketenes which comprises contacting an aliphatic unsaturated ketone having directly linked to the carbonyl group two carbon atoms to which hydrogen is attached with a solid catalyst essentially comprising an acid of phosphorous at a temperature between 200° C. and the temperature at which pyrolysis of said ketone takes place with substantial carbon monoxide formation whereby a ketene and an olefine are formed in the presence of a compound reactive with said ketene under the operating conditions and recovering the resulting product.

9. A process for producing valuable products from unsaturated ketones which comprises passing a mono-olefinic ketone having two aliphatic carbon atoms directly attached to the carbonyl carbon atom and hydrogen attached to the alpha carbon atom in the non-olefinic group at a temperature between 200° C. and 500° C. over a phosphoric acid catalyst at a rate at which conversion of said ketone to a ketene and an olefine takes place.

10. A process for producing valuable products from an olefinic ketone having two aliphatic carbon atoms directly attached to the carbonyl carbon atom and a hydrogen atom attached to an alpha carbon atom which comprises contacting said ketone with an acid catalyst at a temperature between 200° C and the temperature at which decomposition of said ketone to carbon monoxide takes place under the reaction conditions.

11. A process for producing valuable products from an unsaturated ketone having two aliphatic carbon atoms directly attached to the carbonyl carbon atom and a hydrogen atom attached to an alpha carbon atom which comprises contacting said ketone with a non-basic catalyst at a temperature between 200° C. and the temperature at which decomposition of said ketone to carbon monoxide takes place under the reaction conditions.

12. A process for producing reaction products of ketenes which comprises passing an aliphatic mono-olefinic ketone having directly linked to the carbonyl group two carbon atoms to which hydrogen is attached together with water over a solid catalyst essentially comprising an acid of phosphorus at a temperature between 200° C. and the temperature at which pyrolysis of said ketone takes place with substantial carbon monoxide formation.

SUMNER H. McALLISTER.
WILLIAM A. BAILEY, Jr.